United States Patent
Fontana, Jr. et al.

(10) Patent No.: US 7,253,991 B2
(45) Date of Patent: Aug. 7, 2007

(54) PLANAR PERPENDICULAR RECORDING HEAD

(75) Inventors: Robert E. Fontana, Jr., San Jose, CA (US); Kuok San Ho, Santa Clara, CA (US); Ching Hwa Tsang, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 502 days.

(21) Appl. No.: 10/836,918

(22) Filed: Apr. 30, 2004

(65) Prior Publication Data

US 2005/0243463 A1 Nov. 3, 2005

(51) Int. Cl.
G11B 5/127 (2006.01)
G11B 5/31 (2006.01)

(52) U.S. Cl. ..................... 360/126; 360/122
(58) Field of Classification Search ............... 360/125, 360/126, 122
See application file for complete search history.

(56) References Cited

U.S. PATENT DOCUMENTS

RE33,949 E    6/1992  Mallary et al.
2002/0093761 A1*  7/2002  Payne et al. ................ 360/125
2002/0176214 A1* 11/2002  Shukh et al. ............... 360/317
2003/0151850 A1    8/2003  Nakamura et al.
2003/0227714 A1* 12/2003  Parker et al. ............... 360/125
2005/0068669 A1*  3/2005  Hsu et al. ................... 360/125

* cited by examiner

*Primary Examiner*—William J Klimowicz
(74) *Attorney, Agent, or Firm*—G. Marlin Knight

(57) ABSTRACT

A magnetic head (slider) for perpendicular recording which requires no lapping is described. The head is fabricated with an air bearing surface that is parallel to the wafer surface. The coil and pole pieces are formed from thin films disposed parallel to the air bearing surface. Standard lithographic techniques can be used to define the shapes, gaps and pole piece dimensions. Non-rectilinear shapes can be formed; for example, side shields that conform around the write pole piece region. The thickness of the main and return pole pieces are controlled by the deposition process rather than by lapping. The saw cuts used to separate the individual sliders from the rest of the wafer are perpendicular to the air-bearing surface and do not pass through any critical features.

11 Claims, 6 Drawing Sheets

PLANAR PERPENDICULAR RECORDING HEAD

FIELD OF THE INVENTION

The invention relates to magnetic thin film heads for perpendicular recording and more particularly to magnetic pole pieces and shields used in such heads and to storage devices using such heads.

BACKGROUND OF THE INVENTION

In a typical prior art magnetic disk recording system a slider containing magnetic transducers for reading and writing magnetic transitions is supported by a suspension as it flies above the disk that is being rotated by a spindle motor. The disk includes a plurality of thin films and at least one ferromagnetic thin film in which the recording (write) head records the magnetic transitions in which information is encoded. The magnetic domains in the media on can be written longitudinally or perpendicularly. The read and write head portions of the slider are built-up in layers using thin film processing techniques. Typically the read head is formed first, but the write head can also be fabricated first. The conventional write head is inductive and the read sensor is magnetoresistive.

In a disk drive using perpendicular recording the recording head is designed to direct magnetic flux through the recording layer in a direction which is perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head. The shape and size of the main pole piece and associated shields are the primary factors in determining the track width.

In US published application 2003/0151850 by Nakamura, et al., a single pole head is described which has the main pole down-track. The main pole is composed of at least two portions where the width of the first portion continuously increases from the up-track side to the down-track side in the direction of the moving medium and the width of the second portion is the same as the width of the first portion's down-track edge in the direction of the moving medium and is constant from the up-track side to the down-track side in the medium moving direction. This is said to prevent the recording magnetic field strength from decreasing at the track edge and increases the effective track width while suppressing side-writing, thereby, realizing a magnetic recording disk apparatus with a high track density.

In U.S. Pat. RE33,949 to Mallary, et al. a single pole head for perpendicular recording is described which includes what is called a "downstream shield" (down-track) that is connected to the write pole at the back and separated from the write pole by a small gap at the ABS. The ABS face of the shield is designed to be many times as large as the face of the write pole section so that the flux return section acts as a magnetic shield. The density of the flux from the write pole tip is sufficient to effect a vertical recording while the density of the flux passing into the downstream magnetic shield is low so a previously recorded pattern is not reversed or weakened.

In the typical process of fabricating thin film magnetic transducers, a large number of transducers are formed simultaneously on a wafer. After the basic structures are formed the wafer may be sawed into rows or individual transducers. Although sawing has been the typical method for separating the wafers into individual sliders, recently reactive ion etching (RIE) or deep reactive ion etching (DRIE) with a fluorine containing plasma have been used. The surfaces of the sliders perpendicular to the surface of the wafer that are exposed when the wafers are cut eventually form the air bearing surface (ABS) of the slider. The uncertainty of the saw plane leaves unacceptable variations in the magnetic stripe height which would lead to unacceptable variations in magnetic performance if not corrected. Lapping is the process used in the prior art to achieve stripe height control in the nanometer range. For perpendicular recording heads with a trailing shield, the thickness of the trailing shield is also determined by the endpoint of the lapping process.

After lapping, features typically called "rails" are formed on the ABS of magnetic transducer. The rails have traditionally been used to determine the aerodynamics of the slider and serve as the contact area should the transducer come in contact with the media either while rotating or when stationary.

In the prior art the pole piece shapes at the ABS are defined in cross-section orthogonal to the wafer surface. What is needed is magnetic recording head which can be fabricated without lapping and which has lithographically defined pole piece shapes at the ABS.

SUMMARY OF THE INVENTION

A magnetic head (slider) for perpendicular recording which requires no lapping will be described. The head is fabricated with an air bearing surface that is parallel to the wafer surface. The coil and pole pieces are formed from thin films disposed parallel to the air bearing surface. Standard lithographic techniques can be used to define the shapes, gaps and pole piece dimensions. Non-rectilinear shapes can be formed; for example, side shields that conform around the write pole piece region. The thickness of the main and return pole pieces are controlled by the deposition process rather than by lapping. The saw cuts used to separate the individual sliders from the rest of the wafer are perpendicular to the air-bearing surface and do not pass through any critical features.

BRIEF DESCRIPTION OF THE FIGURES

FIG. 4(*b*) illustrates the relationships of the components of the head shown in FIG. 4(*a*) viewed from the wafer surface which is also the ABS.

FIG. 4(*c*) illustrates a midline section, perpendicular to the wafer surface, of a write head with a trailing shield and side shield according to another embodiment of the invention.

DETAILED DESCRIPTION OF THE INVENTION AND THE PREFERRED EMBODIMENTS

Figure 7:
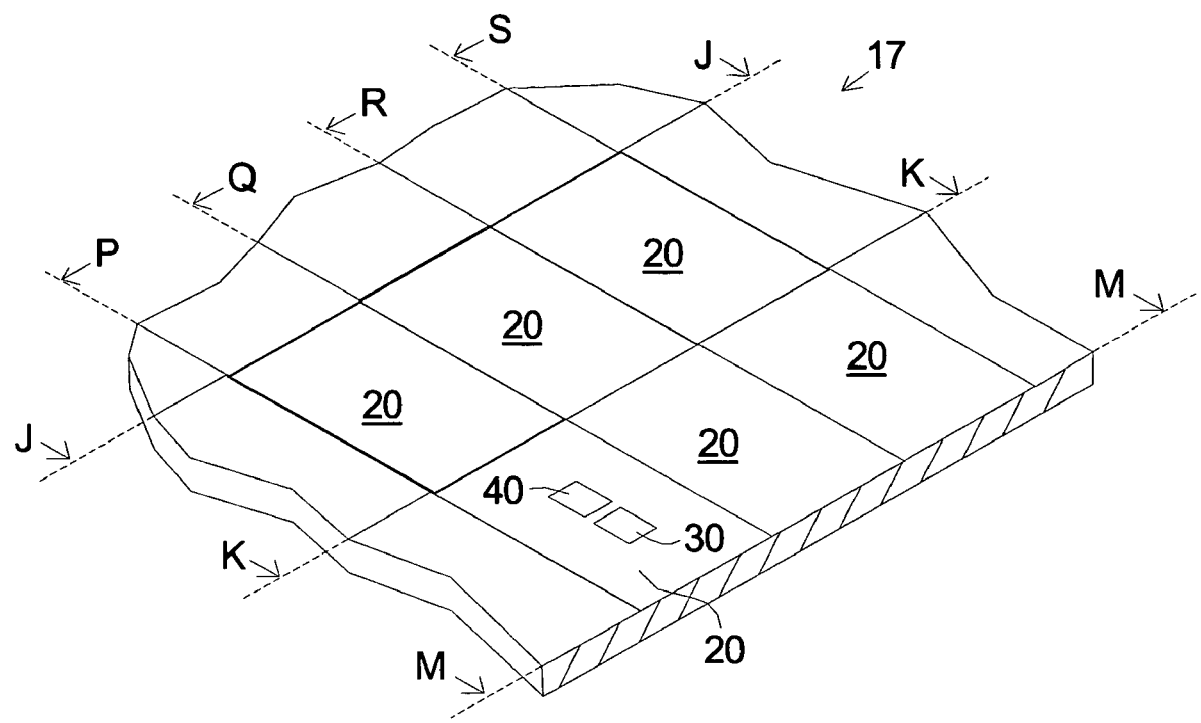
FIG. 7 is an isometric illustration of the cut lines for a wafer with a plurality of heads fabricated according to the invention.

The various embodiments of heads described herein require no lapping. In order to implement this head design, the write head and the read head must be integrated into a fabrication process in which the wafer surface and the thin film layers in a head according to the invention are parallel to the ABS. In the prior art method of fabricating heads the thin films are deposited on the surface of the wafer and are, of course, parallel to the wafer surface, but the wafer, along with the thin films, is cut to expose the edges of the thin film layers. The prior art ABS processing, including lapping, is performed on the exposed edges and the final ABS is oriented perpendicular to the plane of the thin films. In contrast, the ABS is on top of the wafer according to the invention and the cuts made to separate the head from the plurality of other heads on the wafer are made in nonfunctional material on four sides perpendicular to the ABS as illustrated in FIG. 7. Wafer 17 is shown after a plurality of heads (or sliders) 20 have been deposited on the wafer surface. The line labeled M represents a cut in the wafer 17 made to separate the heads 20 from wafer 17. Lines K, J, P, Q, R and S mark future cut lines. Each of the heads 20 have a read head 30 and a write head 40 fabricated parallel to the ABS which is also the upper surface of the wafer 17. The elements in FIG. 7 are not to scale, since the actual sizes of the read and write heads 30, 40 are much smaller than shown in relation the head 20 as will be clear to those skilled in the art. The position of the read and write heads 30, 40 on the head 20 is also not representative. Preferably the read and write heads 30, 40 will be located very near the edge which will be the trailing edge of the head 20 when installed in the magnetic storage device. Since lapping is not required in a process according to the invention, critical alignment of the read head to the write head in the "z" direction is not required. The need to align in the "z" direction is reduced since the critical structures are formed by deposition thicknesses rather than mechanical removal of material. However, with all heads, the centerline placement of the read sensor relative to the center line placement of the write gap does rely on alignment and this is accomplished with lithography. In the prior art scheme, read to write head alignment in the "z" direction was required since the end of lapping determines the final stripe height of the read sensor, as well as, critical dimensions in the write head. In heads for perpendicular recording, however, the prior art ABS processing is even less effective in forming precise dimensions simultaneously in the read sensor and the write head. For example, in some perpendicular head designs, the top of the read sensor must be referenced to the top of the trailing shield type of return pole piece and lapping simultaneously reduces the thickness of the trailing shield and the stripe height making it difficult to precisely control both dimensions. In a process according to the invention the planarization of the ABS including the top of a trailing shield and a read sensor can be accomplished with a simple planarization step, e.g. chemical-mechanical planarization (CMP) and the trailing shield and sensor thickness are determined by deposition of thin films rather than lapping. In addition, the invention allows for the fabrication of simple single pole heads with the shape of the pole tip formed by ion milling and lithography.

The advantages of building a perpendicular recording head with return pole piece or shield formed parallel to the ABS (i.e. incorporating a head design with the ABS parallel to the wafer processing surfaces) include:

1. control of the shield and sensor thickness is determined by deposition rather than lapping.
2. the write gap is controlled by a lithography step
3. shape of critical ABS features is controlled by lithography using a thin resist rather than a tall resist structure.
4. alignment of critical component is controlled by lithography.
5. non-rectilinear shield shapes that conform around the main (write) pole can be lithographically formed.

Figure 1:
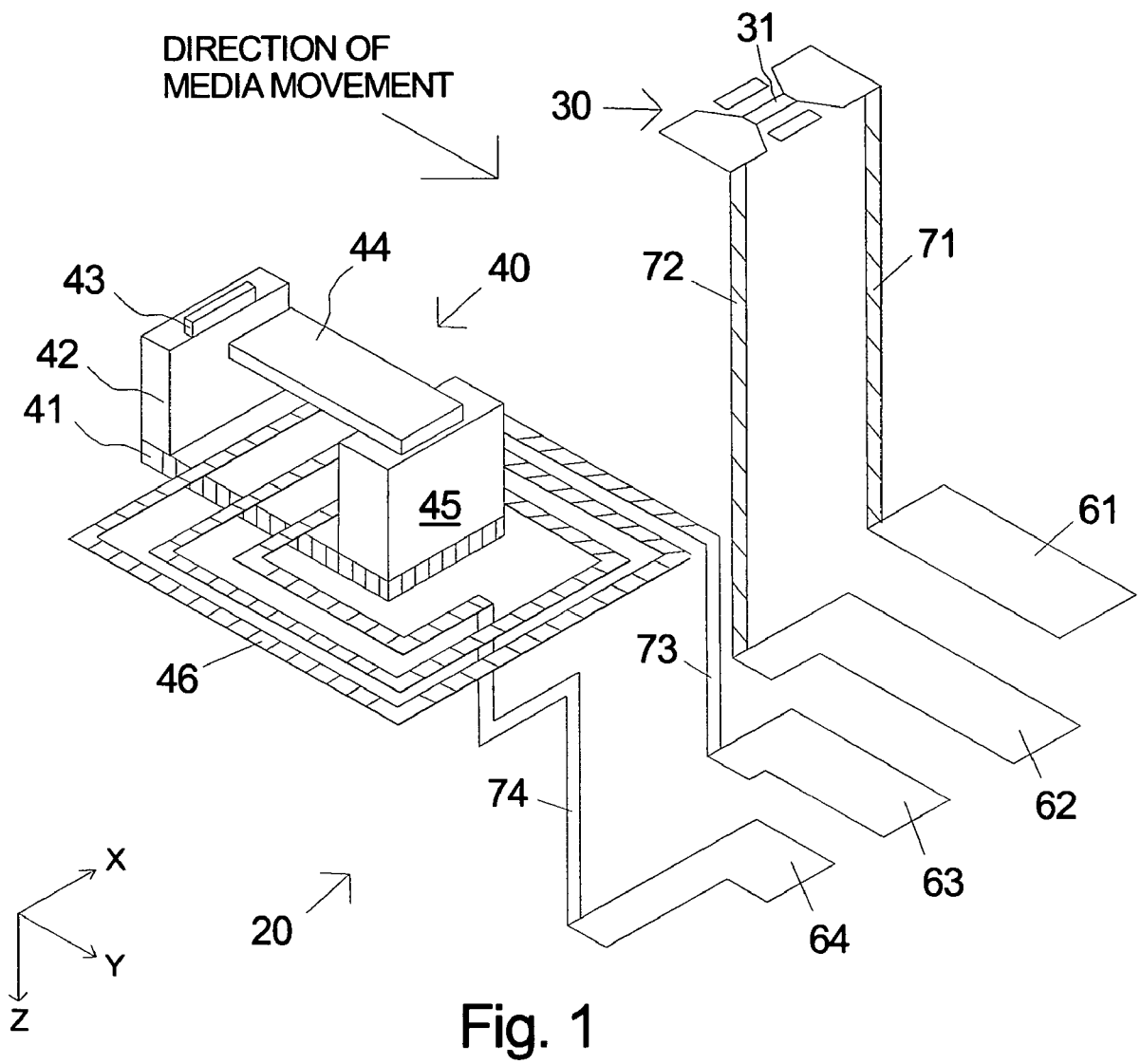
FIG. 1 is an isometric illustration of selected components of a head according to an embodiment of the invention.
Figure 8:
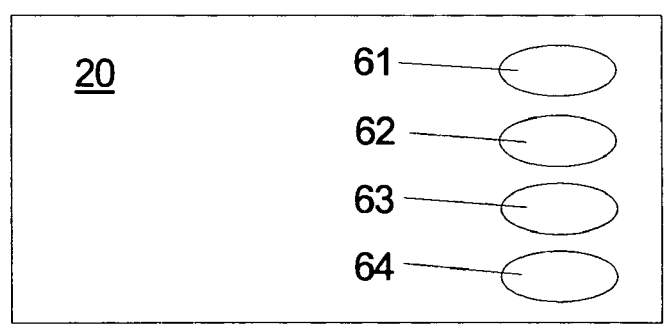
FIG. 8 is an illustration of the bottom surface, opposite to the ABS, of a embodiment of a head according to the invention.

For an overview of a head 20 according to the invention reference is made to FIG. 1 which is an isometric illustration of selected components with the overcoat and substrate removed. This embodiment is a trailing shield design. The drawing is not to scale since the large range in sizes would make it unclear. Except where noted below the relative sizes are according to the prior art and will be apparent to those skilled in the art. The X and Y-dimensions indicated in FIG. 1 are parallel to the surface of the wafer and the Z-dimension is orthogonal to the surface of the wafer. The direction of intended media movement is along the Y-axis from left to right in the figure. The read head 30 and the write head 40 are arranged side-by-side in this embodiment in relation to the direction of the movement of the media. This invention uses lead pads 61, 62, 63, 64 that are disposed on the bottom of the head 20 which is also the bottom of the wafer during fabrication. Note that read head 30 and write head 40 can be placed one following the other, i.e. down stream in the track, as well as side by side. Lead pads 61, 62, 63, 64 are, therefore, in a common plane on the bottom of the wafer as is also shown in FIG. 8. The read head 30 and the write head 40 are formed on the top surface of the wafer. The electrical connectors 71, 72, 73, 74 extend through the wafer from top to bottom, i.e. in the Z-dimension, to connect the read head 30 and the write head 40 to the lead pads 61, 62, 63, 64. One method of fabricating the relatively deep, e.g. 200 um) vias for the electrical connectors 71, 72, 73, 74 uses deep RIE processing into a silicon body. The vias can be filled with Cu to form the connections. The coil 46 in the write head 40 is connected to electrical connectors 73, 74 which in turn connect to the lead pads 64, 63. The coil 46 is made of electrically conductive material and can be spiral or helical. A one layer coil can be defined in a single lithography step since the turns are coplanar on the surface of the wafer at this point in the fabrication process. Although only three turns are shown in the illustration, the coil can have other numbers of turns according to known principles. The yoke of the electromagnet in the write head 40 includes the back of the yoke 41 which is made of ferromagnetic material and is formed prior to the coil 46. The back of the yoke 41 in this embodiment is rectilinear with the two longest dimensions extending parallel to the surface of the wafer. The dimensions of the back of the yoke, along with the dimensions of the other structures of the head, can be determined according to prior art principles except where expressly noted. Dimensions given for structures in specific embodiments should not be taken as limitations on the invention. As an example, the back of the yoke (41) can be made approximately 1 um to 2 um thick (Z), 2 um to 20 um wide (X) and 10 um to 30 um long (Y). The back of the yoke (41) can be formed by electroplating or by vacuum deposition. It can be laminated with alternating layers of ferromagnetic materials and insulating materials. At the ends of the back of the yoke vertical pole pieces 42, 45 extend from the back of the yoke along the sides of the coil 46 toward the ABS. The inside vertical pole piece 45, which extends through the interior of the coil 46 is preferably made thicker (Y) than the outside vertical pole piece 42 since it is the inside vertical pole piece 45 which is in the return flux path. Various embodiments of the invention can have differing pole piece tips as will be seen more clearly below, but in the embodiment shown in FIG. 1, the outside vertical pole piece 42 has main pole piece 43 disposed on top, i.e., nearer to the ABS. The main pole piece 43 is preferably made of a high moment ferromagnetic material, which can be different from the material used for the yoke pieces 41, 42, 45. The main pole piece 43 is preferably smaller in the X and Y dimensions than the outside vertical pole piece 42 in order to concentrate the writing flux. The return pole piece 44 is disposed on top of the inside vertical pole piece 45. The thickness of return pole piece 44 is indicated by dotted lines and arrows as the thickness of the thin film in FIG. 2. It should be noted that the return pole piece 44 and main pole piece 43 are deposited to substantially identical thickness and, in fact, are preferably deposited at the same time. The plane of the thin films is marked and is parallel to the ABS. In the embodiment of FIG. 1 the return pole piece 44 is narrower (X-dimension) than the inside vertical pole piece 45, but is significantly wider (Y-dimension) than the inside vertical pole piece 45. The return pole piece 44 extends from the inside vertical pole piece 45 toward the main pole piece 43 in the Y-dimension to reduce the width of the write gap. At the write gap the confronting surfaces of the main pole piece 43 and the return pole piece 44 are similar in width (X-dimension). The area of the return pole piece 44 in the plane (X-Y) that is parallel to the ABS is made significantly larger than that of the main pole piece 43 in order to reduce the strength of the return field. In this embodiment the inside surface, i.e. the surface facing the write gap, of the main pole piece 43 is coplanar with the inside surface of the outside vertical pole piece 42. In other embodiments the return pole piece and the main pole piece can be shaped and positioned in other ways as will be seen.

The read head 30 is substantially independent from the write head 40. The read head and the write head can be positioned in parallel or tandem with respect to each other and the track direction and there are no electrical connections between them. The lead pads 61, 62 for the read head are conveniently placed in the same plane as the lead pads 63, 64 for the write head. Likewise the sensor 31 is conveniently placed in approximately the same plane as the main pole piece 43. A write head 40 according to the invention can be used with a variety of read head designs with a sensor structure that is planar with film layers parallel to the wafer surface.

Conventional ABS features (not shown) can be formed at the wafer level with RIE into an overcoat, e.g. $SiO_2$, which can be deposited after the features of the read and write heads have been formed.

Figure 2A:
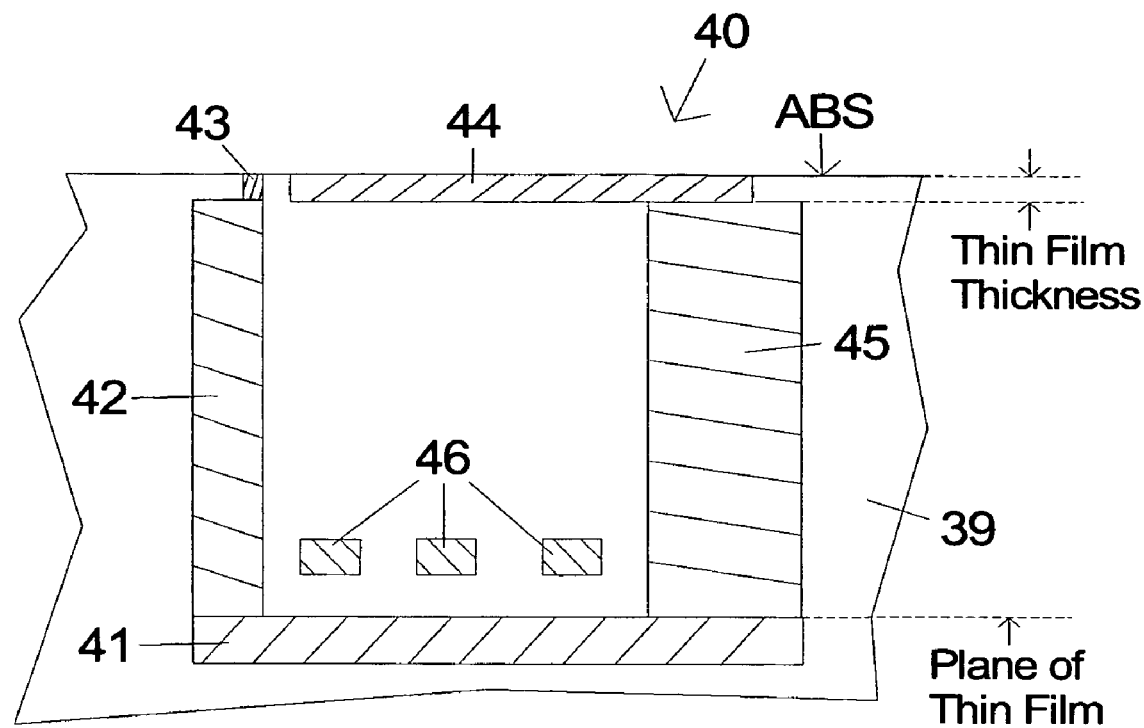
FIG. 2(a) illustrates a midline section, perpendicular to the wafer surface, of a write head with a trailing shield according to an embodiment of the invention.
Figure 2B:
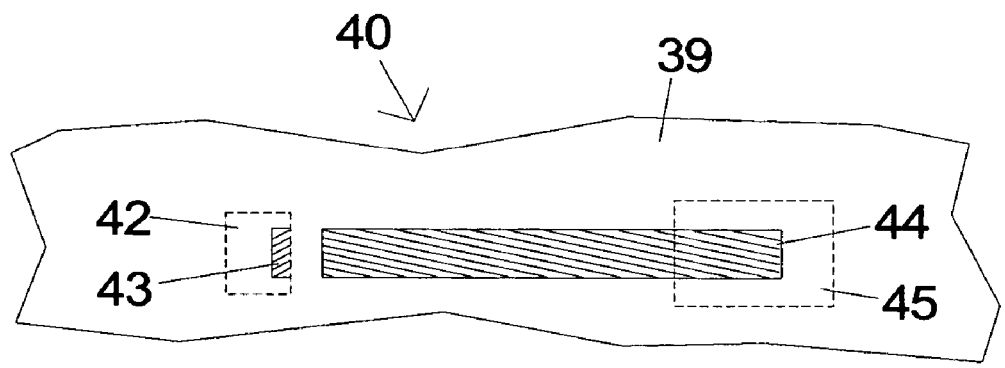
FIG. 2(b) illustrates the relationships of the components of the head shown in FIG. 2(a) viewed from the wafer surface which is also the ABS.

FIG. 2(*a*) illustrates a section of the write head 40 of FIG. 1 taken perpendicular to the ABS. The body material 39 which surrounds the structures of the write head is shown. The overcoat which will typically separate the magnetic components from the air and the media surface is (not shown). In this view the fact that the inside surfaces of the main pole piece 43 and the outside vertical pole piece 42 and coplanar is seen. It should also be noted that the outside vertical pole piece 42 is preferably thicker than the inside vertical pole piece 45 since the later is part of the flux return circuit.

A perpendicular write head has been described where the critical pole features and the return pole features are defined on a wafer surface that is the abs surface. This allows for thickness control of the return shields to be controlled by deposition rather than lapping. This allows for shape control of the return shields and the main pole on the abs to be formed by lithography and simple ion milling of thin materials. FIG. 2(*b*) illustrates the view from the ABS of write head 40 of FIG. 1. The inside vertical pole piece 45 and the outside vertical pole piece 42 are shown in dotted lines since they are recessed from the ABS.

Figure 6:
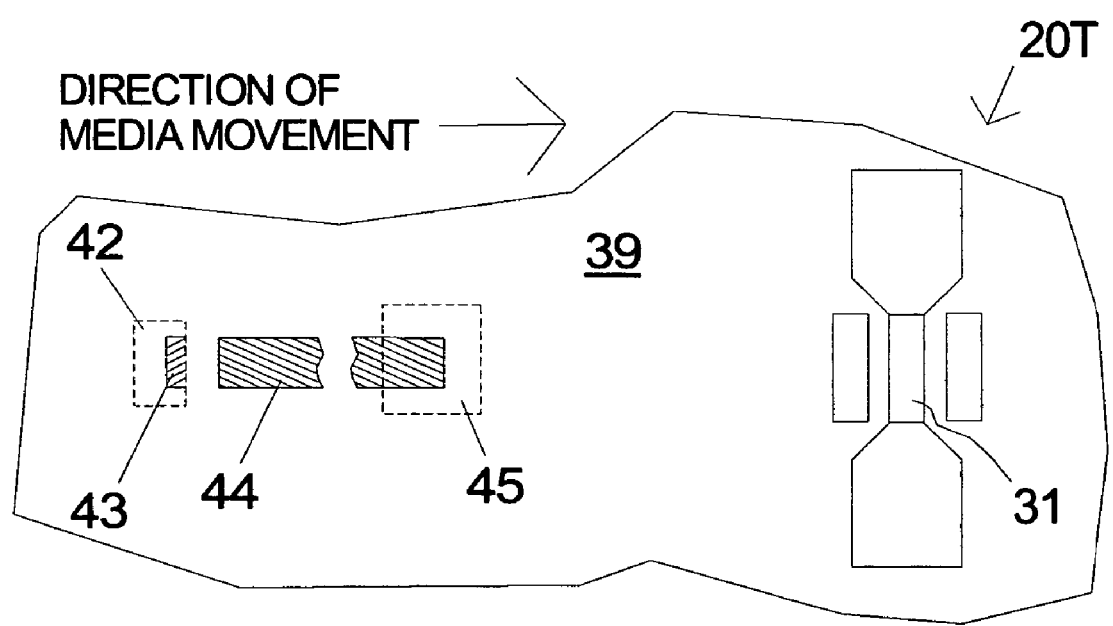
FIG. 6 illustrates a tandem arrangement the write head and read head viewed from the ABS according to an embodiment of the invention.

FIG. 6 illustrates an ABS view of an embodiment of the invention similar to that of FIG. 1 except that the read head and the write head are arranged in tandem. Side-by-side or tandem arrangement of the read and write heads are possible with the design of the invention.

Figure 3A:
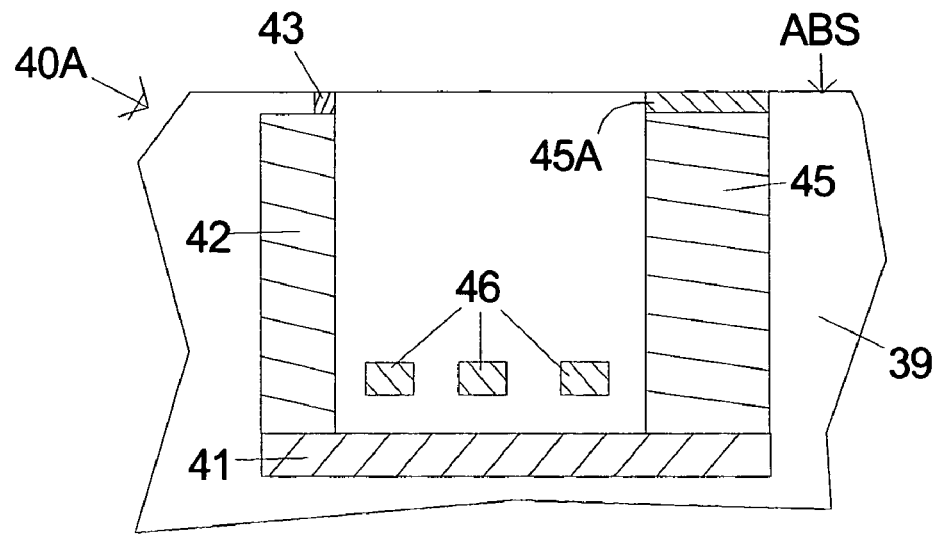
FIG. 3(a) illustrates a midline section, perpendicular to the wafer surface, of a write head with a single probe tip according to an embodiment of the invention.
Figure 3B:
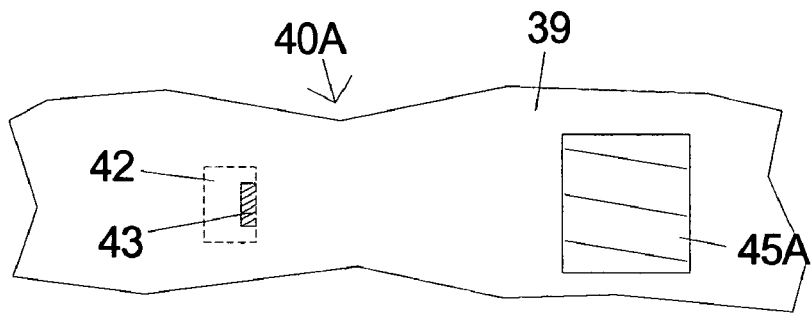
FIG. 3(b) illustrates the relationships of the components of the head shown in FIG. 3(a) viewed from the wafer surface which is also the ABS.
Figure 3C:
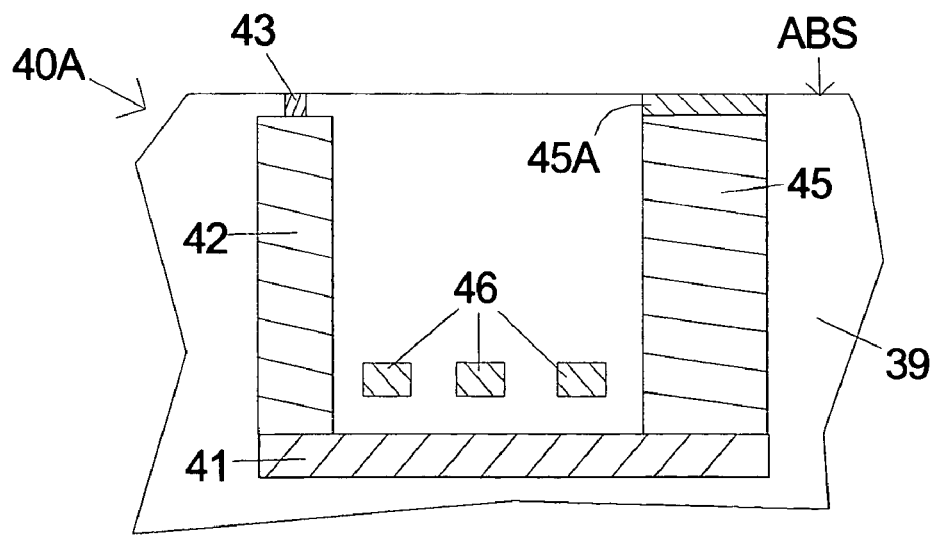
FIG. 3(c) illustrates a midline section, perpendicular to the wafer surface, of a write head with a single probe tip that is not aligned with the inside of the connecting pole piece according to an embodiment of the invention.

FIGS. 3(*a*) and 3(*b*) illustrate an alternative single probe pole tip embodiment of a write head 40A according to the invention. FIG. 3(*a*) illustrates a section of the write head 40A taken perpendicular to the ABS. FIG. 3(*b*) illustrates the view from the ABS of write head 40A. The alternative embodiment of the write head 40A differs from the write head 40 in that the return pole piece 44 has been omitted in write head 40A. To compensate for the lack of a return pole piece, an additional increment 45A is deposited on top of the inside vertical pole piece 45 essentially making it taller. The additional increment 45A can be made of the same material as the inside vertical pole piece 45 or it may be made of a higher moment material. Pole tip 43 need not be coplanar to the inside edge of pole piece 42 as is illustrated in the embodiment shown in FIG. 3*c*.

Figure 4A:
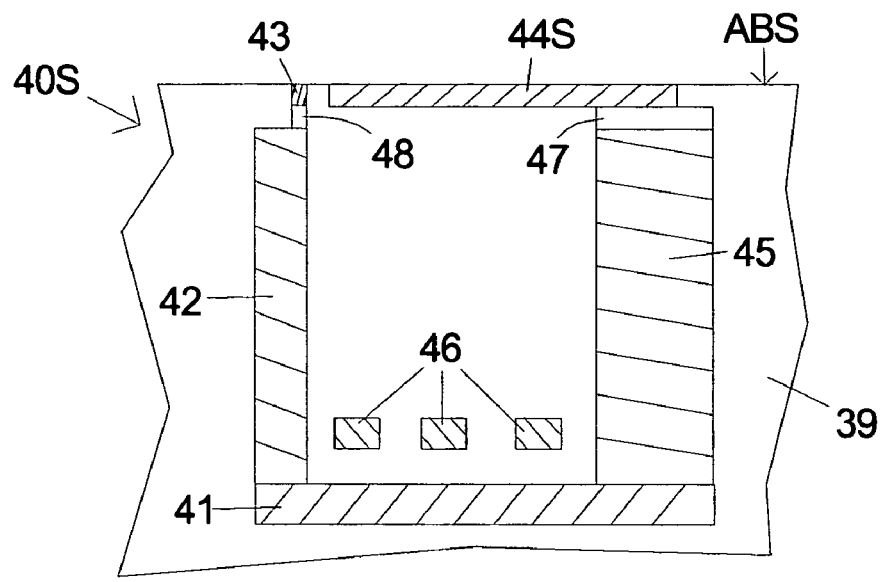
FIG. 4(*a*) illustrates a midline section, perpendicular to the wafer surface, of a write head with a trailing shield and side shields according to an embodiment of the invention.
Figure 4B:
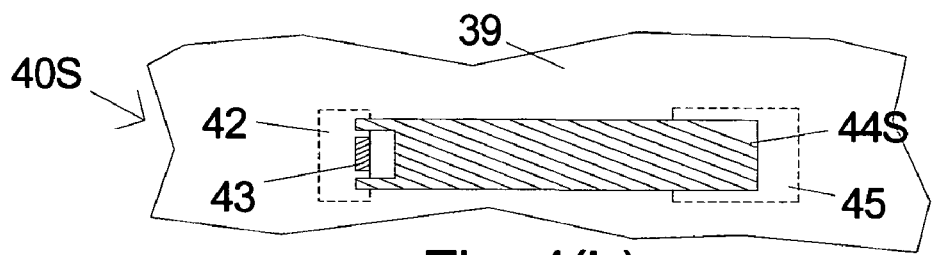
Figure 4C:
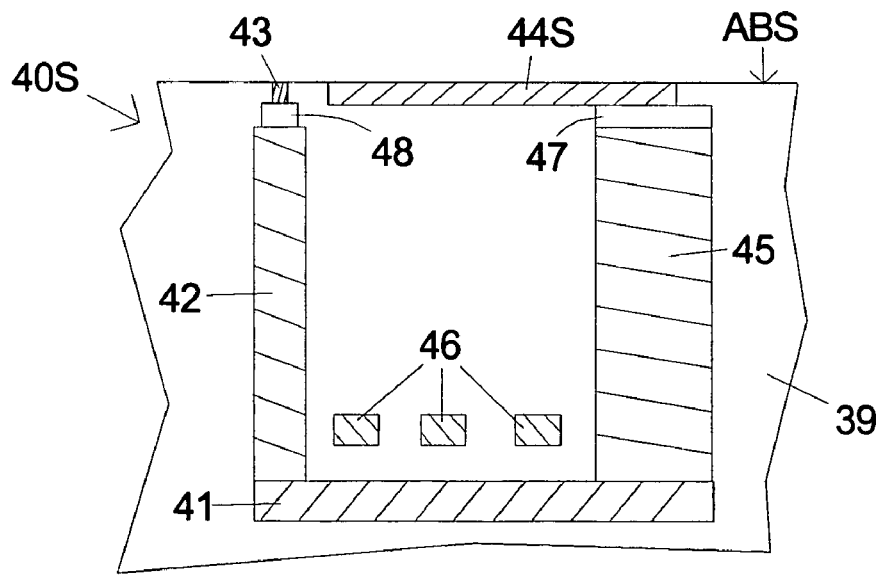

FIGS. 4(*a*) and 4(*b*) illustrate an alternative side shield embodiment of a write head 40A according to the invention. FIG. 4(*a*) illustrates a section of the write head 40S taken perpendicular to the ABS. FIG. 4(*b*) illustrates the view from the ABS of write head 40S. The side shields, which extend along the sides of the main pole piece 43 are an integral feature of the side shield return pole piece 44S, are not separately labeled in FIG. 4(*b*) due to their small size. As in other side shield designs their purpose is to reduce side writing. In order to improve the manufacturability of the write head 40S, main standoff 48 is formed on the top of the outside vertical pole pieces 42. The main standoff 48 has the same shape as the main pole piece 43 which is substantially smaller than the outside vertical pole piece 42. The inclusion of the main standoff 48 creates a clearance region between the outside vertical pole piece 42 and the side shield portion of the side shield return pole piece 44S. A matching return standoff 47 is formed on top of the inside vertical pole piece 45 to, in effect, increase the height of the inside vertical pole piece 45 so that the side shield return pole piece 44S is connected to the inside vertical pole piece 45. Neither pole tip 43 nor standoff layer 48 need be coplanar to the inside edge of pole piece 42 as is illustrated in the embodiment shown in FIG. 4c. In addition the inside and outside edges of pole tip 43 and standoff layer 48 need not be coplanar. Specifically, the length (Y direction in FIG. 1) of pole piece 43 can be smaller than the length of standoff layer 48. This is shown in FIG. 4c.

Figure 5:
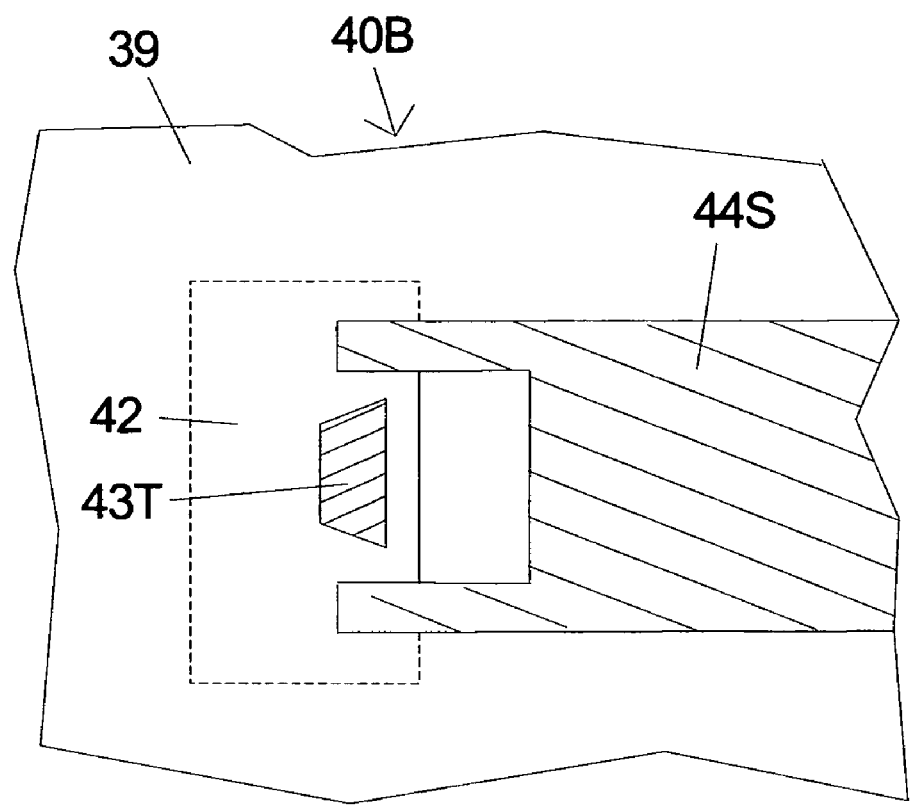
FIG. 5 illustrates an enlarged view from the ABS of a trailing shield and side shields according to an embodiment of the invention with a trapezoidal shaped pole tip.

FIG. 5 illustrates an alternative embodiment of a write head 40B that includes both side shielding and trailing shielding and that incorporates a trapezoidal pole tip shape 43T. The view from the ABS of write head 40B. In this embodiment the main pole piece 43T is trapezoidal in shape as viewed from the ABS. The base of the trapezoidal shape is disposed nearest to the return pole piece 44S. The trapezoidal shaped main pole piece 43T is a preferred embodiment that can be used in any of the write head embodiments according to the invention.

A head according to the invention can be fabricated using standard thin film fabrication techniques. However, some standard techniques can be used in new ways. For example, the write gap in a head according to the invention can determined by lithography and subtractive processing (milling or RIE). The main pole piece and the return pole piece are formed in the same thin film plane; therefore, the write gap is determined by the lithography used to form these magnetic structures. In embodiments with side shields, the side gap is similarly controlled. In fact, the critical shapes, positions and dimensions of all of the features at the ABS, including the read sensor, in a head according to the invention can similarly be determined by lithography with the full range of thin film fabrication techniques being available.

The invention has been described with respect to particular embodiments, but other uses and applications for the ferromagnetic structure according to the invention will be apparent to those skilled in the art.

The invention claimed is:

1. A thin film magnetic recording head for use with a magnetic recording medium comprising:
   a write head including a main pole piece having a first thickness measured perpendicular to an air-bearing surface and being formed in a first thin film plane from a first thin film disposed parallel to a substrate surface and the air-bearing surface; and a return pole piece, disposed in the first thin film plane, the return pole piece being formed from the first thin film, having a thickness that is approximately equal to the first thickness and having a volume larger than a volume of the main pole piece.

2. A thin film magnetic recording head of claim 1 wherein the write head further comprises:
   a first vertical pole piece;
   a second vertical pole piece; and
   a coil of electrically conductive material wrapping around the first or second vertical pole piece;
   wherein, the main pole piece is disposed on the first vertical pole piece at the air-bearing surface and the main pole piece is smaller than the first vertical pole piece and the return pole piece is disposed on the second vertical pole piece at the air-bearing surface the return pole piece extending closer to the main piece than the second vertical pole piece.

3. The thin film magnetic recording head of claim 2 wherein an inside surface of the main pole piece is coplanar with an inside surface of the first vertical pole piece and the inside surfaces face the return pole piece and the second vertical pole piece respectively.

4. The thin film magnetic recording head of claim 1 wherein the air-bearing surface has four cut edges extending perpendicular to the air-bearing surface with zero cut edges passing through the main pole piece.

5. A thin film magnetic recording head for use with a magnetic recording medium comprising:
   a substrate supporting thin films disposed parallel to an air-bearing surface;
   a yoke comprising first and second vertical pole pieces;
   a coil of electrically conductive material wrapping around the first or second vertical pole piece;
   a main standoff of ferromagnetic material disposed on the first vertical pole piece at the air-bearing surface;
   a main pole piece disposed on the main standoff the main pole piece being made from a first thin film;
   a return standoff of ferromagnetic material disposed on the second vertical pole piece at the air-bearing surface; and
   a return pole piece disposed on the return standoff at the air-bearing surface the return pole piece being made from the first thin film and being larger in volume than the main hole niece.

6. The thin film magnetic recording head of claim 5 wherein the main pole piece has an inside surface that is coplanar with an inside surface of the main standoff, the inside surfaces facing toward the return pole piece and the return standoff respectively and being setback from an inside surface of the first vertical pole piece facing toward the second vertical pole piece; and wherein the return pole piece extends beyond an inside edge of the second vertical pole piece toward the main pole piece to narrow a gap between the main pole piece and the return pole piece.

7. The thin film magnetic recording head of claim 5 wherein the return pole piece has a trailing shield and first and second side shields that are disposed on first and second sides of the main pole piece as viewed from the air-bearing surface.

8. The thin film magnetic recording head of claim 5 wherein inside surfaces of the main pole piece and the main standoff are coplanar with an inside surface of the first vertical pole piece, the inside surfaces facing the return pole piece, the return standoff and the second vertical pole piece respectively.

9. The thin film magnetic recording head of claim 8 wherein the return pole piece has first and second side shields that are disposed on first and second sides of the main pole piece as viewed from the air-bearing surface.

10. The thin film magnetic recording head of claim 9 wherein the first and second side shields are non-rectilinear shapes that conform around the main pole piece.

11. The thin film magnetic recording head of claim 5 wherein surfaces of the main pole piece perpendicular to the air-bearing surface are recessed from surfaces of the first vertical pole piece perpendicular to the air-bearing surface.

* * * * *